(12) United States Patent
Kwak et al.

(10) Patent No.: US 11,019,211 B1
(45) Date of Patent: May 25, 2021

(54) MACHINE LEARNING BASED CALL ROUTING-SYSTEM (71) Applicant: UIPCO, LLC, San Antonio, TX (US)

(72) Inventors: Victor Kwak, Frisco, TX (US); Seth E. Ethington, McKinney, TX (US); Jesse Williams Plymale, Dallas, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/837,957

(22) Filed: Apr. 1, 2020

Related U.S. Application Data (60) Provisional application No. 62/828,295, filed on Apr. 2, 2019.

(51) Int. Cl.
*H04M 3/523* (2006.01)
*G06N 20/00* (2019.01)
*G10L 25/90* (2013.01)
*H04M 3/51* (2006.01)
*G06Q 30/00* (2012.01)
*G06N 3/08* (2006.01)

(52) U.S. Cl.
CPC .......... *H04M 3/5232* (2013.01); *G06N 3/084* (2013.01); *G06N 20/00* (2019.01); *G06Q 30/016* (2013.01); *G10L 25/90* (2013.01); *H04M 3/5175* (2013.01); *H04M 3/5237* (2013.01); *G10L 2025/906* (2013.01)

(58) Field of Classification Search
CPC .. H04M 3/5232; H04M 3/5237; G06N 20/00; G10L 25/90; G10L 2025/906
USPC ... 379/266.01, 88.01, 266.1, 265.05, 265.11, 379/265.06, 265.03, 265.01, 242
See application file for complete search history.

(56) References Cited

U.S. PATENT DOCUMENTS

| | | | | |
|---|---|---|---|---|
| 9,030,968 | B2 * | 5/2015 | Furlong | .............. H04L 12/2803 370/261 |
| 2008/0219429 | A1 * | 9/2008 | Mandalia | ............ H04M 3/5175 379/266.02 |
| 2010/0316199 | A1 * | 12/2010 | Martin, II | ............. H04L 65/605 379/88.08 |

* cited by examiner

*Primary Examiner* — Thjuan K Addy
(74) *Attorney, Agent, or Firm* — Perkins Coie LLP (57) ABSTRACT

Machine learning technology can analyze in real-time the data from a call between a person and a customer service representative. Based on this analysis, a server can determine a sentiment score that describes a sentiment expressed by the person or the customer service representative. If the server determines that the sentiment score is less than or equal to a pre-determined value, the server can inform the customer service representative's manager so that the manager can take further action to help the person and/or the customer service representative.

20 Claims, 4 Drawing Sheets

MACHINE LEARNING BASED CALL ROUTING-SYSTEM

CROSS-REFERENCE TO RELATED APPLICATIONS

This application is a non-provisional of and claims priority to U.S. Provisional Application No. 62/828,295, filed on Apr. 2, 2019, entitled "MACHINE LEARNING BASED CALL ROUTING SYSTEM," which is hereby incorporated by reference in its entirety for all purposes.

TECHNICAL FIELD

This disclosure is directed generally to systems, methods, and apparatus for routing calls.

BACKGROUND

When a person calls an organization's customer service phone number, he or she is routed to a customer service representative. To talk to the customer service representative, the call routing system may request the person identify the reason for his or her call. In some cases, the call routing system may provide options such as dialing a number for an option related to complaints. The call routing system may also request the person to enter identifying information about him or her, such as a member number or a birthdate. After the person enters the requested information, the call routing system typically routes the person to the next available customer service representative.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A conventional call routing system can randomly route a person's call to a next available customer service representative based on a reason for the person's call. For instance, the conventional call routing system can request a person to identify a reason for his or her call and can determine that the person is calling about credit card fraud. Based on this reason, the conventional call routing system can randomly select a next available customer service representative within the credit card fraud department to answer the person's call. When a customer service representative speaks to a person, the customer service representative may be able to determine whether the person is angry or happy based on the person's tone of voice. However, the conventional call routing system may not be able to provide any additional insight as to whether the person's words and/or tone is associated with a positive sentiment or a negative sentiment.

Furthermore, at the end of a phone call, the conventional call routing system may present an option to a person to take a survey that provides information as to whether the person had a positive experience or a negative experience. However, most people do not take the survey, reducing the sample size of the customers used to determine a metric (e.g., customer satisfaction score) that describes a probability of whether customers had a positive or negative phone call experience. Moreover, the few people who do take the survey are typically either extremely satisfied or extremely dissatisfied, which does not provide representative data for customer satisfaction.

To overcome at least some of the issues described above for a conventional call routing system, this patent document describes systems, apparatus, and methods for routing calls based on analyzing in real-time a conversation between a person and a customer service representative, where the conversation may take place over a phone call. Such a technique can provide a better measure of customer satisfaction score without relying on customer surveys that tend to be ineffective, skewed, or both. The technology described herein can be used to analyze other types of communication such as chat, text messages, and emails. The example headings for the various sections below are used to facilitate the understanding of the disclosed subject matter and do not limit the scope of the claimed subject matter in any way. Accordingly, one or more features of one section can be combined with one or more features of another section.

I. Determine Customer Satisfaction Score

Figure 1:
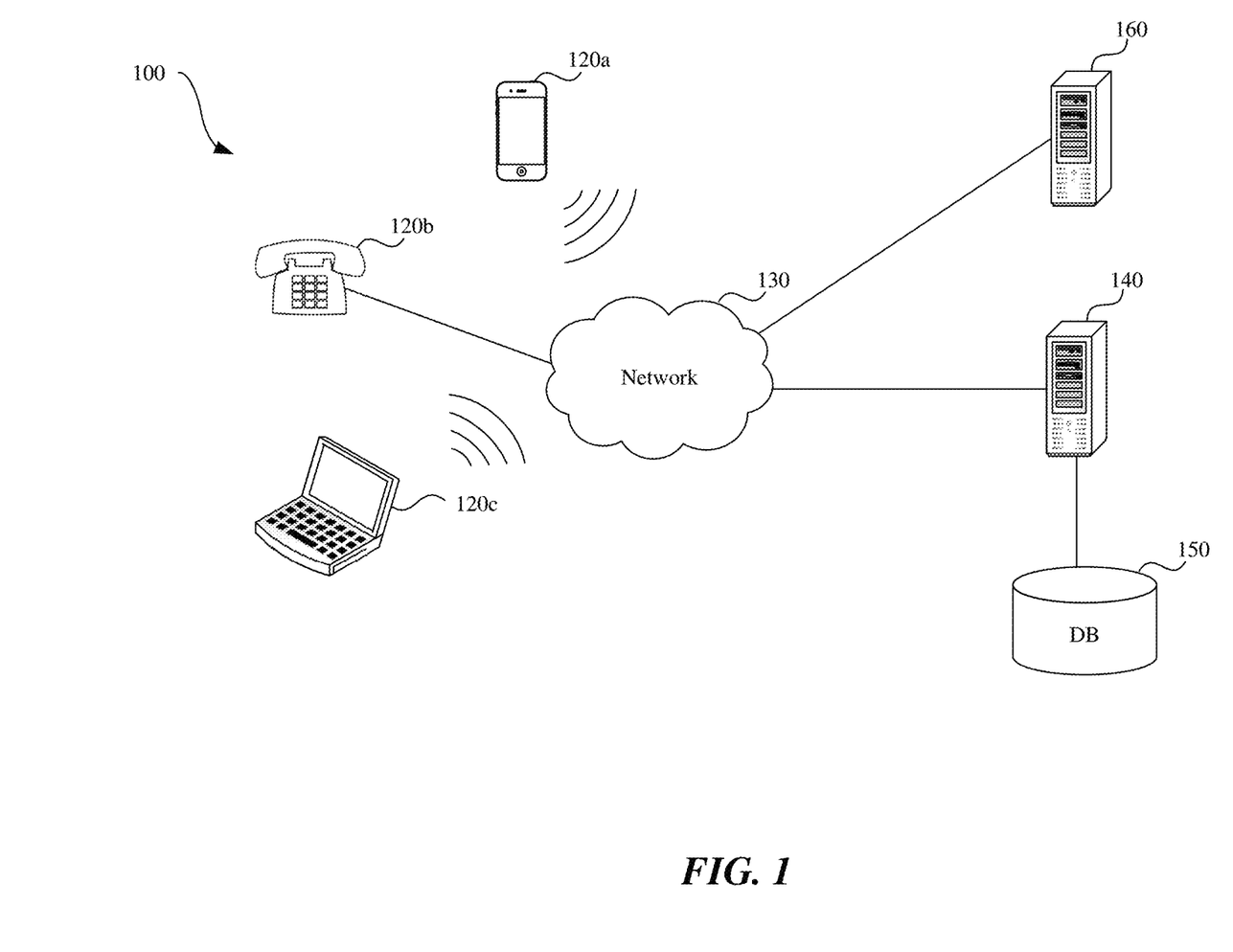
FIG. 1 shows an example of a call routing system.

FIG. 1 shows an example of a call routing system 100 that includes user devices 120a-120c that can call a number to talk to customer service representatives at a customer call center. The calls from the user devices 120a-120c can be sent to or can be managed by the call routing server 140. For example, a call initiated by a user device, such as a mobile device 120a, may be sent to a call routing server 140 via a communication network 130. The communication network 130 may include the Internet, a cellular network, a public switched telephone network (PSTN), a voice over Internet Protocol (VOIP) network, or any combination thereof. This patent document describes various operations performed by the call routing server 140. In some embodiments, a single server can perform the operations described for the call routing server 140. In some other embodiments, multiple servers can perform the operations described for the call routing server 140.

When a person calls a customer call center to speak to a customer service representative, the person can indicate a topic of conversation via a user device (e.g., a mobile phone). The person can provide the topic to an Interactive Voice Response system (IVR) within call routing server 140 in some implementations. In an example financial services use case, a topic may include (1) credit card, (2) insurance, (3) loans, (4) account status, etc. After the call routing server 140 routes the person's call to a customer service representative, a call recording server 160 can record the conversation between the person and the customer service representative. The call recording server 160 can also gather additional information such as an identifier that identifies the person. Examples of an identifier can include a device identifier (e.g., device fingerprint), member number, login information, or personal information (e.g., social security number or phone number) of the person. In some embodiments, the call routing server 140 can perform the operations of the call recording server 160.

The call recording server 160 can provide the recorded conversation (e.g., recorded audio or text transcript of the conversation) and/or other call related information to the call routing server 140 in real-time as the person is speaking to the customer service representative. The call routing server 140 can use the real-time recorded conversation data to determine a plurality of sentiment scores associated with different points in time on the call. The sentiment scores describe a sentiment of the person or the customer service representative at the various points in time on the call. By determining the sentiment scores at different points in time on the call, the call routing server 140 can determine how well a customer service representative is handling the call from the person, as will be further explained in this patent document. In some embodiments, the analysis of the call is completed after the call is complete and used to train or rate customer service representatives, to change standard responses to customer questions, to change delivery of a certain message, or for other purposes.

In some embodiments, the call routing server 140 can employ machine learning technology to determine the plurality of sentiment scores indicating the caller's view or attitude on the call. For example, a call routing server 140 can determine the plurality of sentiment scores based a supervised machine learning technique. In this example, a machine learning model operating on the call routing server 140 can receive the recorded text or audio or both and output a sentiment scores based on the words used in a pre-determined time window (e.g., every 5 seconds or every one-minute). The machine learning model can determine sentiment scores at various points in time on the call as the person is speaking to the customer service representative. For example, the call routing server 140 can determine a sentiment score for every 15 seconds on a call, so that if a length of the call is 3 minutes, the call routing server 140 can determine 12 scores and associate those scores to various points in time on the call (e.g., at 15-th second, at 30-th second, and so on).

In some embodiments where the call routing server 140 determines the sentiment scores based at least in part on audio of the conversation, the call routing server 140 can determine sentiment scores based on an inflection of the person's voice (e.g., pitch, cadence volume of speech) and/or based on an inflection of the customer service representative's voice. In some embodiments, the machine learning model operating on the call routing server 140 can determine sentiment score based on a single word within a pre-determined time window. For example, if a person used a profanity on the call, the call routing server 140 can determine a low sentiment score for the pre-determined time window that includes the profanity. In other embodiments, a low score is only assigned if a profanity is used with a raised voice, indicating anger.

In some embodiments, the machine learning model can scale or adjust the determined sentiment scores based on a time of day when a person is calling to speak to a customer service representative.

The call routing server 140 can perform mathematical operations on the determined sentiment scores to determine how well the customer service representative is handling the call with the person. In some embodiments, the call routing server 140 can average the scores to determine an overall sentiment score, which can be used to assess how the call is going. In some embodiments, the call routing server 140 can obtain an overall sentiment score by determining a difference between the first score obtained at a first point in time in the conversation and the latest score obtained at the most recent point in time in the conversation. By taking a difference between the two scores and by comparing the difference to a threshold value, the call routing server 140 can provide a more descriptive measure of how well a call is going as compared to taking an average of the determined sentiment scores.

For example, if a person calling a customer service representative is angry at the beginning of the conversation and by the middle of the conversation the person's tone and/or words indicate a positive call experience, the call routing server 140 determines a low sentiment score (e.g., 0.2 out of 1) at the beginning of the call and a high sentiment score (e.g., 0.7 out of 1) at the middle of the call. In this example, the call routing server 140 can determine that the difference between the two scores is positive or greater than a pre-determined score (e.g., 0.3), which can indicate that the call is going or has gone well. Conversely, in another example, if a person calling a customer service representative has a neutral tone or uses words that are neutral at the beginning of the conversation and by the middle of the conversation, the person's words indicate that he or she is upset with the customer service representative, the call routing server 140 determines a neutral sentiment score (e.g., 0.5) at the beginning of the call and a low sentiment score (e.g., 0.3) at the middle of the call. In this second example, the call routing server 140 can determine that the difference between the two scores is negative or is less than or equal to the pre-determined score (e.g., 0.3), which can indicate that the call is not going well. The call routing server 140 can determine an overall sentiment score that can describe how well the call is going (e.g., neutral, positive, or negative), where the overall sentiment score can be a difference between two sentiment scores or it can be an average of the plurality of sentiment scores.

By determining an overall sentiment score, the call routing server 140 can determine whether the overall sentiment score is less than or equal to a pre-determined score so that the call routing server 140 can perform additional operation(s) to improve the sentiment score or future sentiment scores. For example, if the call routing server 140 determines that the overall sentiment score on a call with a customer service representative is less than or equal to the pre-determined score, the call routing server 140 can send a message to a computer associated with a manager of the customer service representative to inform the manager that the call is not going well. The message can be displayed as a graphical user interface (GUI) on the manager's computer.

Figure 2:
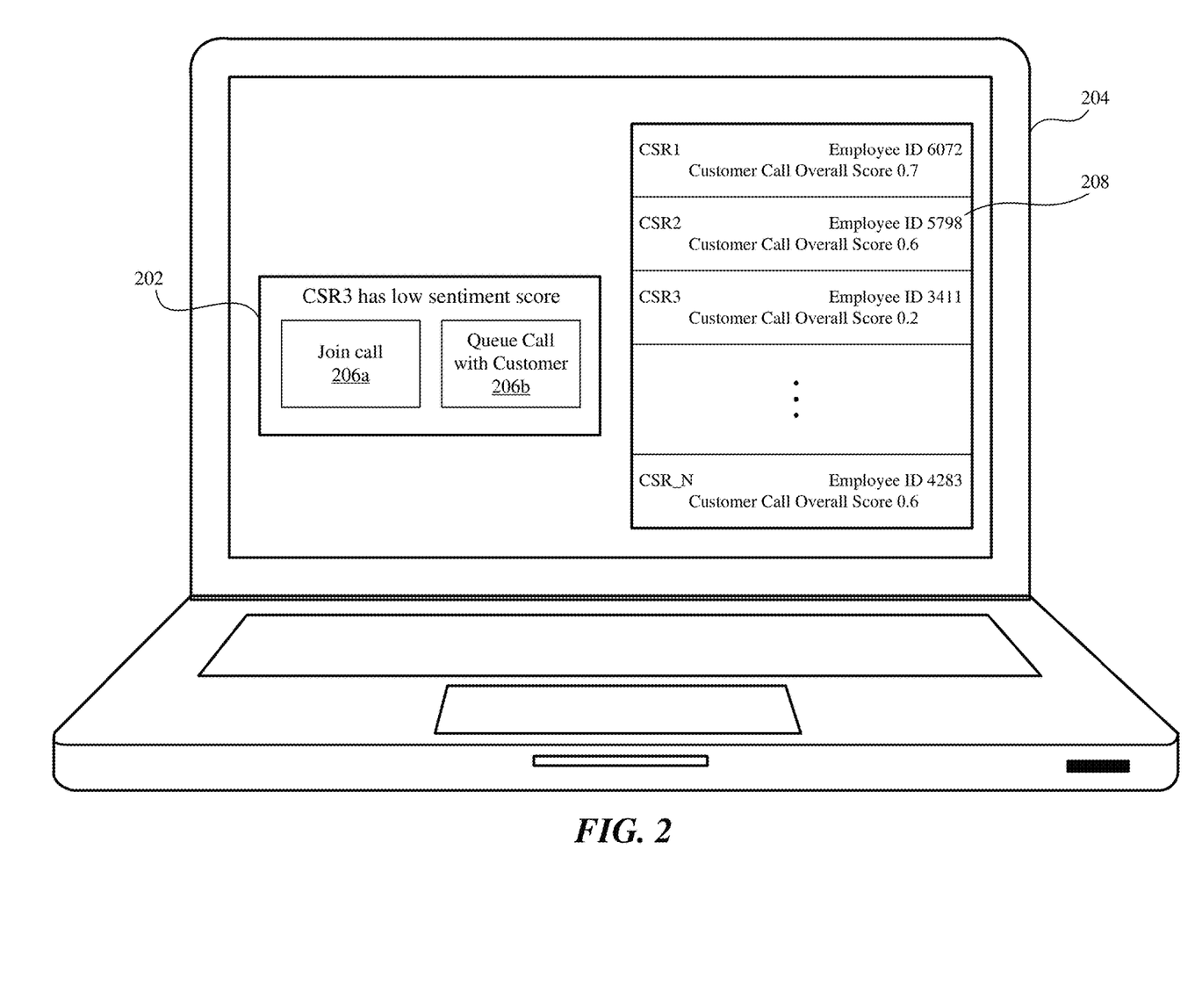
FIG. 2 shows an example graphical user interface (GUI) of one or more selectable options presented to a manager when an overall sentiment score is determined to be below a threshold value.

FIG. 2 shows an example GUI of one or more selectable options presented to a manager when an overall sentiment score is determined to be below a threshold value. The GUI shown in FIG. 2 is displayed on a computer 204 (e.g., laptop) associated with a manager of customer service representatives. On the right side of FIG. 2, the call routing server 140 can show the manager a list of overall sentiment scores of ongoing phone calls with customer service representatives that report to the manager. As shown in the right side of FIG. 2, the GUI shows a manager overall sentiment scores associated with customer service representatives who can be identified by employee identifiers 208. In some embodiments, after a call is completed, the sentiment scores can be recorded for data analysis and follow-up.

If the call routing server 140 determines that one of the customer service representative's overall sentiment score is less than a threshold value (e.g., CSR3's score is 0.2, which is less than the 0.4 threshold value), then the call routing server 140 can send a message 202 to the manager's computer 204. In the example shown in FIG. 2, the message 202 is shown as a prompt that appears on the computer's display to the left of the list of scores. In some embodiments, a message 202 sent to the manager's computer 204 may have one or more selectable options 206*a*, 206*b*. For example, one of the selectable options 206*a* can allow the manager to listen or speak on the call while the call is on-going between the person calling and the customer service representative. In this example, if the manager clicks on the selectable option to listen and/or speak on the call, the call that is currently underway between the person and the customer service representative can be routed to the manager's listening/speaking device (e.g., telephone call or computer) while also being connected to the customer service representative's listening/speaking device. This can allow the customer service representative to continue speaking with the person, but the manager can also speak to help the person and the customer service representative.

In another example, one of the selectable options 206*b* can allow the manager to queue a call with the person once the call between the person and the customer service representative has been terminated. In this example, the manager can call back the person after the person is done speaking with the customer service representative so that the manager can improve the person's sentiment. If the manager selects option 206*b*, the call routing server queues a second call by determining that the first call is terminated between the person and the customer service representative and by determining a number (e.g., phone number) of a device associated with the person to initiate the second call with the person. At some later point in time after the first call has terminated (e.g., one day later), the manager can initiate a second call with the person since that person's number has been stored in a queue for the manager to call. One benefit of this option is that it can allow the manager to directly speak to the person so that the manager can help resolve any issues that the person may have. Another benefit of this option is that it can help a company proactively improve customer satisfaction since the person who had a negative call experience on his or her first call with a customer service representative will most likely call again to speak to another customer service representative about the same issue.

Figure 3:
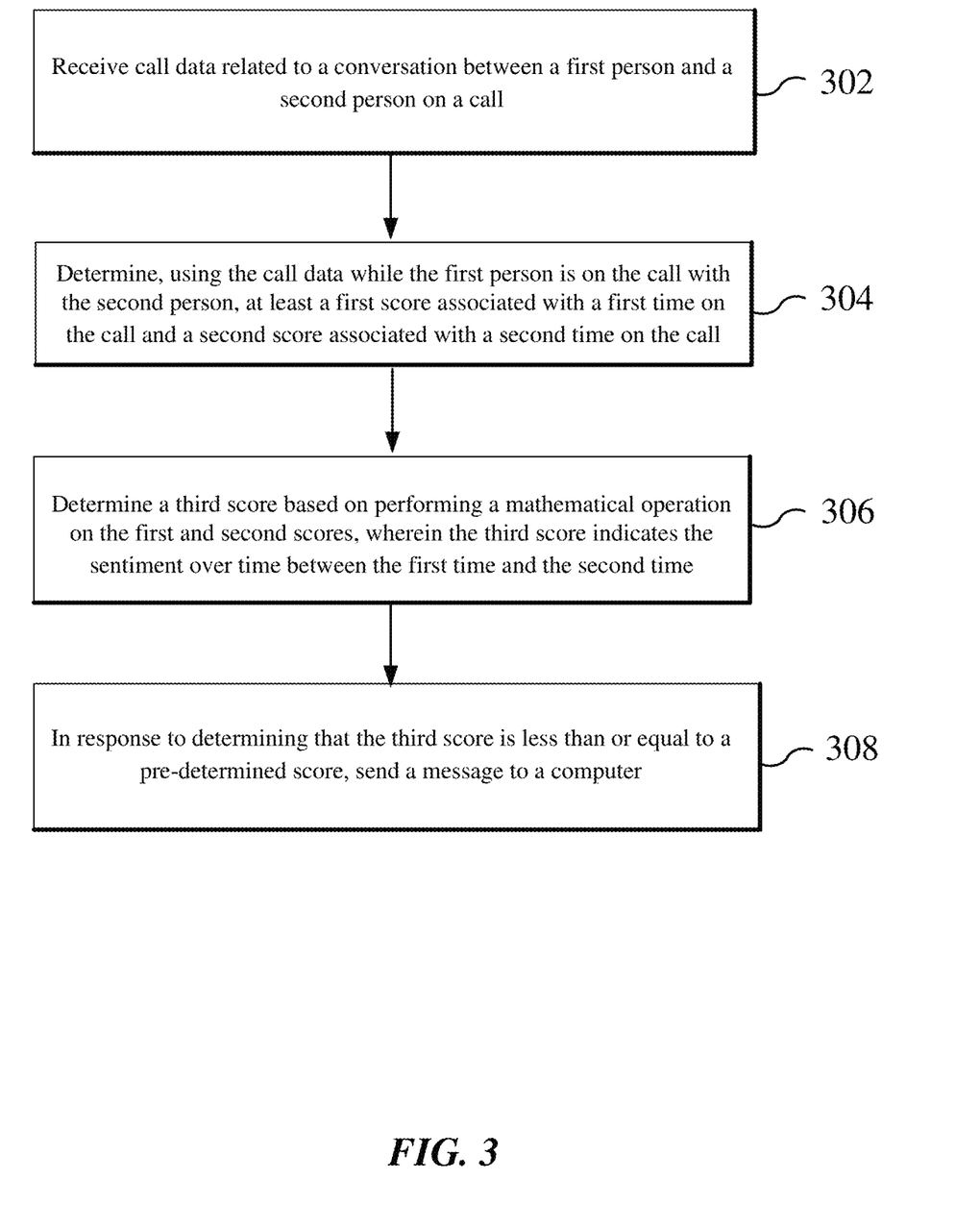
FIG. 3 shows a flow diagram for performing a sentiment score analysis on a call.

FIG. 3 shows a flow diagram for performing a sentiment score analysis on a call. At the receiving operation 302, a call routing server receives call data related to a conversation between a first person and a second person on a call. The call data is received while the first person is on the call with the second person, the call data includes recorded words from the first and second person, and the first person initiates the call via a first device.

At the determining operation 304, the call routing server determines, using the call data while the first person is on the call with the second person, at least a first score associated with a first time on the call and a second score associated with a second time on the call. The first score and the second score describe a sentiment of the first person or the second person at the first time and the second time, respectively, and the first time precedes the second time. In some embodiments, the first time is within a pre-determined time window that begins from a start of the conversation on the call, and the second time is outside the pre-determined time window.

At the determining operation 306, the call routing server determines a third score based on performing a mathematical operation on the first and second scores, where the third score indicates the sentiment over time between the first time and the second time. In some embodiments, the performing of the mathematical operation includes determining an average of the first and second scores or determining a difference between the first and second scores.

At the sending operation 308, the call routing server determines that the third score is less than or equal to a pre-determined score and in response sends a message to a computer. In some embodiments, the message includes a selectable option to allow a third person to listen or speak on the call while the call is mapped to a second device of the second person.

In some embodiments, the call routing server that can perform the operations of FIG. 3 is further configured to receive an indication from the computer that the third person selected the selectable option to join the call and in response route the call to a third device of the third person while the call is connected to the second device. In some embodiments, the message includes a second selectable option to allow the third person to queue a second call to speak to first person after the call is terminated, and where the call routing server is further configured to receive a second indication that the third person selected the second selectable option to queue the second call and in response determine that the call is terminated and queue the second call by determining a number associated with the first device, wherein the number is used to initiate the second call.

In some embodiments, the first score and the second score are determined by a supervised machine learning technique. In some embodiments, the first score and the second score are determined based on an inflection of a voice of the first person or a voice of the second person, or the first score and the second score are determined based on the recorded words.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described for FIGS. 1 to 3, and/or in the various embodiments described in this patent document.

II. Providing Feedback Based on Sentiment Scores

After a call terminates, the call routing server 140 can determine a final overall sentiment score and can store this score on the database 150. The final overall sentiment score for a call can be a difference or an average of two sentiment scores where one of the sentiment scores is determined towards the beginning of the conversation and another sentiment score is determined towards the end of the conversation. In some embodiments, the call routing server 140 can store in the database 150 the final overall sentiment score for each call answered by each customer service representative. A manager can review the scores stored on the database 150 and can provide feedback if a customer service representative consistently receives a low final overall sentiment score or can praise the customer service representative if that customer service representative consistently receives a high final overall sentiment score.

In some embodiments, the call routing server 140 can send a message to a computer associated with a manager if the call routing server 140 determines that a customer service representative has received a number of low final overall sentiment scores that exceed a pre-determined number in a certain time period. For example, if the call routing server 140 determines that a customer service representative has a sentiment score of 0.1, 0.3, 0.12, and 0.25 in 4 hours, which the call routing server 140 determines to be low using the techniques described in Section I), and if the maximum number of low final overall sentiment scores in 4-hours is pre-configured to be three, then the call routing server 140 can send a message to the computer associated with the manager of the customer service representative to inform the manager of a consistent low sentiment score. In this example, the message may include the customer service representative's identity (e.g., name or employee identifier), the four final overall sentiment scores, and/or the recorded words from each conversation that led to the low final overall sentiment scores. Using this information, the manager can provide guidance or feedback to the customer service representative, so that he or she can improve the sentiment scores, and thus, improve customer satisfaction.

III. Additional Uses for Sentiment Scores

The techniques described in this patent document can be used to determine sentiment based on words recorded on any platform. For example, if two employees from a company are chatting using a web-chat feature approved by the company and if the employees have consented to the company monitoring data on the web-chat platform, then a server can determine sentiment score for the web-chat record based on the techniques described in this patent document. The sentiment score can be used to determine employee morale or employee reaction to various corporate events (e.g., bonus, mergers and acquisitions, change in corporate policies, etc.). Similarly, conversation between two employees speaking on a corporate telephone can be monitor and analyzed to provide a sentiment score. The sentiment scores can be aggregated and provided to the company's leaders so that they can determine employees' reaction to various corporate events and whether the company's leaders could have changed their message regarding a corporate event to improve the sentiment of the employees.

Figure 4:
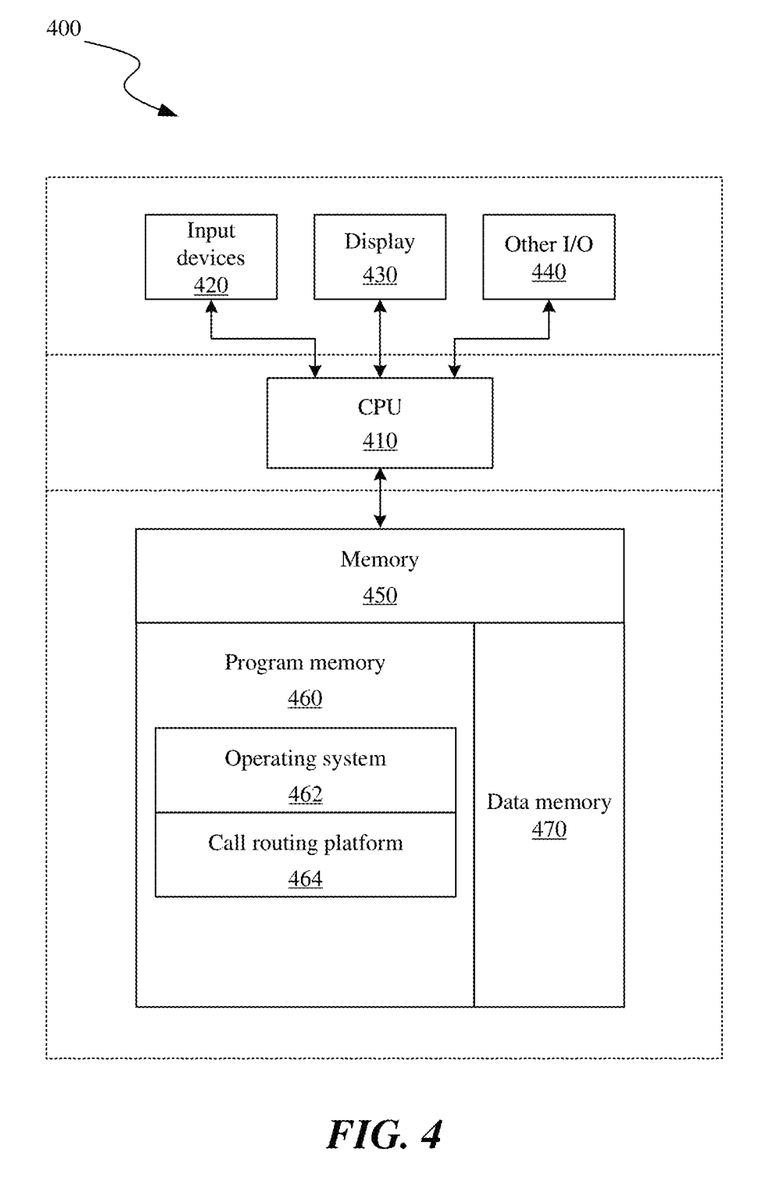
FIG. 4 is a block diagram illustrating an overview of devices on which some implementations of the call routing server can operate.

FIG. 4 is a block diagram illustrating an overview of devices on which some implementations of the call routing server can operate. The devices can comprise hardware components of a device 400, such as the call routing server that includes a call routing platform 464 that determines sentiment scores based on call data received from another server and maps a current call between a person, a customer service representative, and a manager of the customer service representative based on an overall sentiment score of the current call. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and call routing platform 464. The call routing platform 464 may include modules or processes or methods for determining sentiment scores, calculating overall sentiment scores, and mapping a current call between a person, a customer service representative, and a manager of the customer service representative based on techniques described in Section I and FIGS. 1-3 of this patent document. The call routing platform 464 may also include modules for performing the feedback operation as described in Section II of this patent document and/or the corporate sentiment assessment operation described in Section III of this patent document. Thus, for example, the memory 450 may store instructions that upon execution by CPU 410 configure the device 400 to perform the operations described for the call routing server in FIGS. 1 to 3 and/or in the various embodiments described in this patent document. Memory 450 can also include data memory 470 that can include the various scores described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims. To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for routing a call, comprising:
a server configured to:
receive call data related to a conversation between a first person and a second person on a call,
wherein the call data is received while the first person is on the call with the second person,
wherein the call data includes recorded words from the first and second person, and
wherein the first person initiates the call via a first device;
determine, using the call data while the first person is on the call with the second person, at least a first score associated with a first time on the call and a second score associated with a second time on the call,
wherein the first score and the second score describe a sentiment of the first person or the second person at the first time and the second time, respectively, and
wherein the first time precedes the second time;
determine a third score based on performing a mathematical operation on the first and second scores, wherein the third score indicates the sentiment over time between the first time and the second time; and
in response to determining that the third score is less than or equal to a pre-determined score, send a message to a computer,
wherein the message includes a selectable option to allow a third person to listen or speak on the call while the call is mapped to a second device of the second person.

2. The system of claim 1, wherein the server is further configured to:
receive an indication from the computer that the third person selected the selectable option to join the call and in response route the call to a third device of the third person while the call is connected to the second device.

3. The system of claim 1,
wherein the message includes a second selectable option to allow the third person to queue a second call to speak to first person after the call is terminated, and
wherein the server is further configured to:
receive a second indication that the third person selected the second selectable option to queue the second call and in response determine that the call is terminated and queue the second call by determining a number associated with the first device, wherein the number is used to initiate the second call.

4. The system of claim 1, wherein the performing of the mathematical operation includes determining an average of the first and second scores or determining a difference between the first and second scores.

5. The system of claim 1,
wherein the first time is within a pre-determined time window that begins from a start of the conversation on the call, and
wherein the second time is outside the pre-determined time window.

6. The system of claim 1, wherein the first score and the second score are determined by a supervised machine learning technique.

7. The system of claim 1,
wherein the first score and the second score are determined based on an inflection of a voice of the first person or a voice of the second person, or
wherein the first score and the second score are determined based on the recorded words.

8. A method of analyzing a call, comprising:
receiving call data related to a conversation between a first person and a second person on the call,
wherein the call data is received while the first person is on the call with the second person,
wherein the call data includes recorded words from the first and second person, and
wherein the first person initiates the call via a first device;
determining, using the call data while the first person is on the call with the second person, at least a first score associated with a first time on the call and a second score associated with a second time on the call,
wherein the first score and the second score describe a sentiment of the first person or the second person at the first time and the second time, respectively, and
wherein the first time precedes the second time;
determining a third score based on performing a mathematical operation on the first and second scores, wherein the third score indicates the sentiment over time between the first time and the second time; and
in response to determining that the third score is less than or equal to a pre-determined score, sending a message to a computer,
wherein the message includes a selectable option to allow a third person to listen or speak on the call while the call is mapped to a second device of the second person.

9. The method of claim 8, further comprising:
receiving an indication from the computer that the third person selected the selectable option to join the call and in response route the call to a third device of the third person while the call is connected to the second device.

10. The method of claim 8,
wherein the message includes a second selectable option to allow the third person to queue a second call to speak to first person after the call is terminated, and
wherein the method further comprising:
receiving a second indication that the third person selected the second selectable option to queue the second call and in response determine that the call is terminated and queue the second call by determining a number associated with the first device, wherein the number is used to initiate the second call.

11. The method of claim 8, wherein the performing of the mathematical operation includes determining an average of the first and second scores or determining a difference between the first and second scores.

12. The method of claim 8,
wherein the first time is within a pre-determined time window that begins from a start of the conversation on the call, and
wherein the second time is outside the pre-determined time window.

13. The method of claim 8, wherein the first score and the second score are determined by a supervised machine learning technique.

14. The method of claim 8,
wherein the first score and the second score are determined based on an inflection of a voice of the first person or a voice of the second person, or
wherein the first score and the second score are determined based on the recorded words.

15. A non-transitory machine-readable medium having machine executable instructions stored thereon that, when executed by one or more processors, direct the one or more processors to perform a method comprising:
  receiving call data related to a conversation between a first person and a second person on a call,
    wherein the call data is received while the first person is on the call with the second person,
    wherein the call data includes recorded words from the first and second person, and
    wherein the first person initiates the call via a first device;
  determining, using the call data while the first person is on the call with the second person, at least a first score associated with a first time on the call and a second score associated with a second time on the call,
    wherein the first score and the second score describe a sentiment of the first person or the second person at the first time and the second time, respectively, and
    wherein the first time precedes the second time;
  determining a third score based on performing a mathematical operation on the first and second scores,
    wherein the third score indicates the sentiment over time between the first time and the second time; and
  in response to determining that the third score is less than or equal to a pre-determined score, sending a message to a computer,
    wherein the message includes a selectable option to allow a third person to listen or speak on the call while the call is mapped to a second device of the second person.

16. The non-transitory machine-readable medium of claim 15, wherein the method further comprises:
  receiving an indication from the computer that the third person selected the selectable option to join the call and in response route the call to a third device of the third person while the call is connected to the second device.

17. The non-transitory machine-readable medium of claim 15,
  wherein the message includes a second selectable option to allow the third person to queue a second call to speak to first person after the call is terminated, and
  wherein the method further comprising:
    receiving a second indication that the third person selected the second selectable option to queue the second call and in response determine that the call is terminated and queue the second call by determining a number associated with the first device, wherein the number is used to initiate the second call.

18. The non-transitory machine-readable medium of claim 15, wherein the performing of the mathematical operation includes determining an average of the first and second scores or determining a difference between the first and second scores.

19. The non-transitory machine-readable medium of claim 15,
  wherein the first time is within a pre-determined time window that begins from a start of the conversation on the call, and
  wherein the second time is outside the pre-determined time window.

20. The non-transitory machine-readable medium of claim 15,
  wherein the first score and the second score are determined based on an inflection of a voice of the first person or a voice of the second person, or
  wherein the first score and the second score are determined based on the recorded words.

* * * * *